US011486568B2

(12) United States Patent
Chan et al.

(10) Patent No.: US 11,486,568 B2
(45) Date of Patent: Nov. 1, 2022

(54) LAMP RADIATOR, LAMP AND LAMP ASSEMBLY

(71) Applicant: TROLMASTER ARGO INSTRUMENTS CO., LIMITED, Kowloon (HK)

(72) Inventors: Ka Suen Chan, Hong Kong (HK); Yao Liang Lin, Fujian (CN)

(73) Assignee: TROLMASTER ARGO INSTRUMENTS CO., LIMITED, Kowloon (HK)

( * ) Notice: Subject to any disclaimer, the term of this patent is extended or adjusted under 35 U.S.C. 154(b) by 0 days.

(21) Appl. No.: 17/079,507

(22) Filed: Oct. 25, 2020

(65) Prior Publication Data

US 2022/0128231 A1     Apr. 28, 2022

(51) Int. Cl.
*F21V 29/74* (2015.01)
*F21V 29/503* (2015.01)
*F21V 29/508* (2015.01)
*F21Y 115/10* (2016.01)

(52) U.S. Cl.
CPC ............ *F21V 29/74* (2015.01); *F21V 29/503* (2015.01); *F21V 29/508* (2015.01); *F21Y 2115/10* (2016.08)

(58) Field of Classification Search
CPC ....... F21V 29/74; F21V 29/503; F21V 29/508; F21Y 2115/10
See application file for complete search history.

(56) References Cited

U.S. PATENT DOCUMENTS

2009/0323324 A1\* 12/2009  Liu ................... F21V 15/01
                                                  362/234
2016/0305619 A1\* 10/2016  Howe ................ F21V 7/16

FOREIGN PATENT DOCUMENTS

CN       101545594 A  \*  9/2009  .............. F21V 25/04
WO   WO-2012070749 A2  \*  5/2012  ............ F21V 7/0016

\* cited by examiner

*Primary Examiner* — Anabel Ton

(57) ABSTRACT

A lamp radiator, a lamp and a lamp assembly are provided. The lamp radiator includes a base and a number of radiating fins fixed on the base, wherein the base includes a mounting surface and a radiating surface opposite to the mounting surface, and the radiating fins are arranged on the radiating surface at intervals; the mounting surface includes a first mounting surface and a second mounting surface, an included angle is defined between the first mounting surface and the second mounting surface, and a direction of the included angle towards the radiating fins.

19 Claims, 4 Drawing Sheets

US 11,486,568 B2

LAMP RADIATOR, LAMP AND LAMP ASSEMBLY

TECHNICAL FIELD

The present application relates to the technical field of lighting technology, and more particularly to a lamp radiator, a lamp and a lamp assembly.

BACKGROUND

With the aggravation of environmental pollution, greenhouse and indoor planting which is completely isolated from the outside world has been widely popularized. Light is one of the most important physical environmental factors for plant growth and development, thus plant growth lamps are usually used for photosynthesis in plants.

A good heat dissipation structure is conducive to the use of the plant growth lamps with LEDs as the luminous body, due to poor ventilation of indoor planting, heat generated by LEDs is not easy to dissipate. On the other hand, LEDs of plant growth lights are usually located on a flat surface, and a light angle is limited, resulting in low light source utilization.

SUMMARY

One embodiment of the present application provides a lamp radiator, including a base and a plurality of radiating fins fixed on the base;

wherein the base includes a mounting surface and a radiating surface opposite to the mounting surface, and the plurality of radiating fins are arranged on the radiating surface at intervals;

the mounting surface includes a first mounting surface and a second mounting surface, an included angle is defined between the first mounting surface and the second mounting surface and a direction of the included angle towards the radiating fins.

Another embodiment of the present application provides a lamp, including a radiator and a circuit board group fixed on the radiator, and the radiator including a base and a plurality of radiating fins fixed on the base;

wherein the base includes a mounting surface and a radiating surface opposite to the mounting surface, and the plurality of radiating fins are arranged on the radiating surface at intervals;

the mounting surface includes a first mounting surface and a second mounting surface, an included angle is defined between the first mounting surface and the second mounting surface, and a direction of the included angle towards the radiating fins, the circuit board group includes a first circuit board and a second circuit board respectively provided with LED modules, the first circuit board is arranged on the first mounting surface, and the second circuit board is arranged on the second mounting surface.

Another embodiment of the present application provides a lamp assembly, including a lamp driver, a lamp, a first connecting member, and a second connecting member, the lamp including a radiator and a circuit board group fixed on the radiator, and the radiator including a base and a plurality of radiating fins fixed on the base;

wherein the base includes a mounting surface and a radiating surface opposite to the mounting surface, and the plurality of radiating fins are arranged on the radiating surface at intervals;

the mounting surface includes a first mounting surface and a second mounting surface, an included angle is defined between the first mounting surface and the second mounting surface, and a direction of the included angle towards the radiating fins, the circuit board group includes a first circuit board and a second circuit board respectively provided with LED modules, the first circuit board is arranged on the first mounting surface, and the second circuit board is arranged on the second mounting surface;

the first connecting member is configured to electrically connect the lamp driver and the first circuit board, and the second connecting member is configured to electrically connect the lamp driver and the second circuit board.

BRIEF DESCRIPTION OF THE DRAWINGS

One or more embodiments are illustrated by way of example, and not by limitation, in the figures of the accompanying drawings, wherein components having the same reference numeral designations represent like components throughout. The drawings are not to scale, unless otherwise disclosed.

DETAILED DESCRIPTION

For clearer descriptions of the objectives, technical solutions, and advantages of the present application, the present application is further described with reference to specific embodiments and attached drawings. It should be understood that the specific embodiments described herein are only intended to explain the present application instead of limiting the present application.

It should be noted that when an element is "secured to/fixedly connected with" another element, it can be a direct relationship or there can be one or more intervening elements therebetween. When an element is defined as "being connected or coupled to" another element, the element may be directly connected or coupled to the element or one or more centered elements may be present therebetween. As used herein, the terms "vertical", "horizontal", "left", "right", and similar expressions are for illustration purposes.

As used herein, "mounting" includes welding, screwing, snapping, gluing or the like to secure or limit an element or device to a particular position or location, the element or device may remain stationary or movable within limits at the particular position or location, and the element or device may be removable or not after being secured or limited to the particular position or location, which is not limited in the embodiments of the present application.

Figure 1:
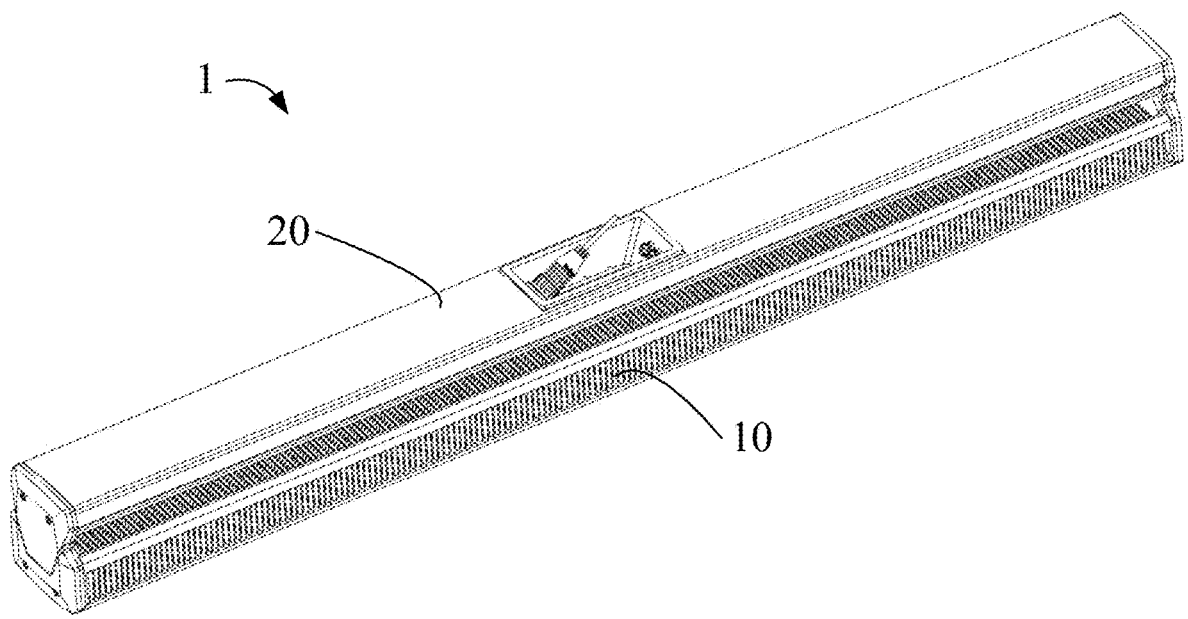
FIG. 1 is a structure diagram of a lamp assembly according to an embodiment of the present application.

Referring to FIG. 1, an embodiment of the present application provides a lamp assembly 1 including a lamp 10 and a lamp driver 20, the lamp driver 20 is used to drive the lamp 10, wherein the lamp 10 is a LED lamp, and the lamp driver 20 is a LED driver. The lamp assembly 1 may be applied to household lighting and industrial lighting, for example, the lamp assembly 1 is applied to a dressing room, of which the lamp 10 is a daylighting lamp. Another example, the lamp assembly 1 is applied to greenhouse and indoor planting, of which the lamp 10 is a plant growth lamp.

Figure 2:
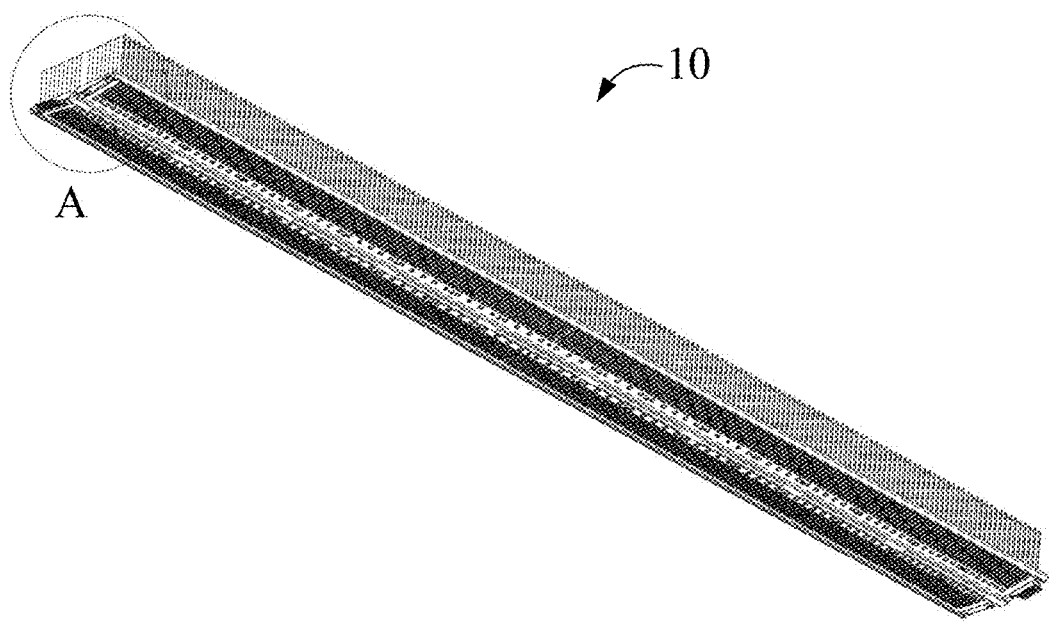
FIG. 2 is a structure diagram of a lamp according to an embodiment of the present application.
Figure 3:
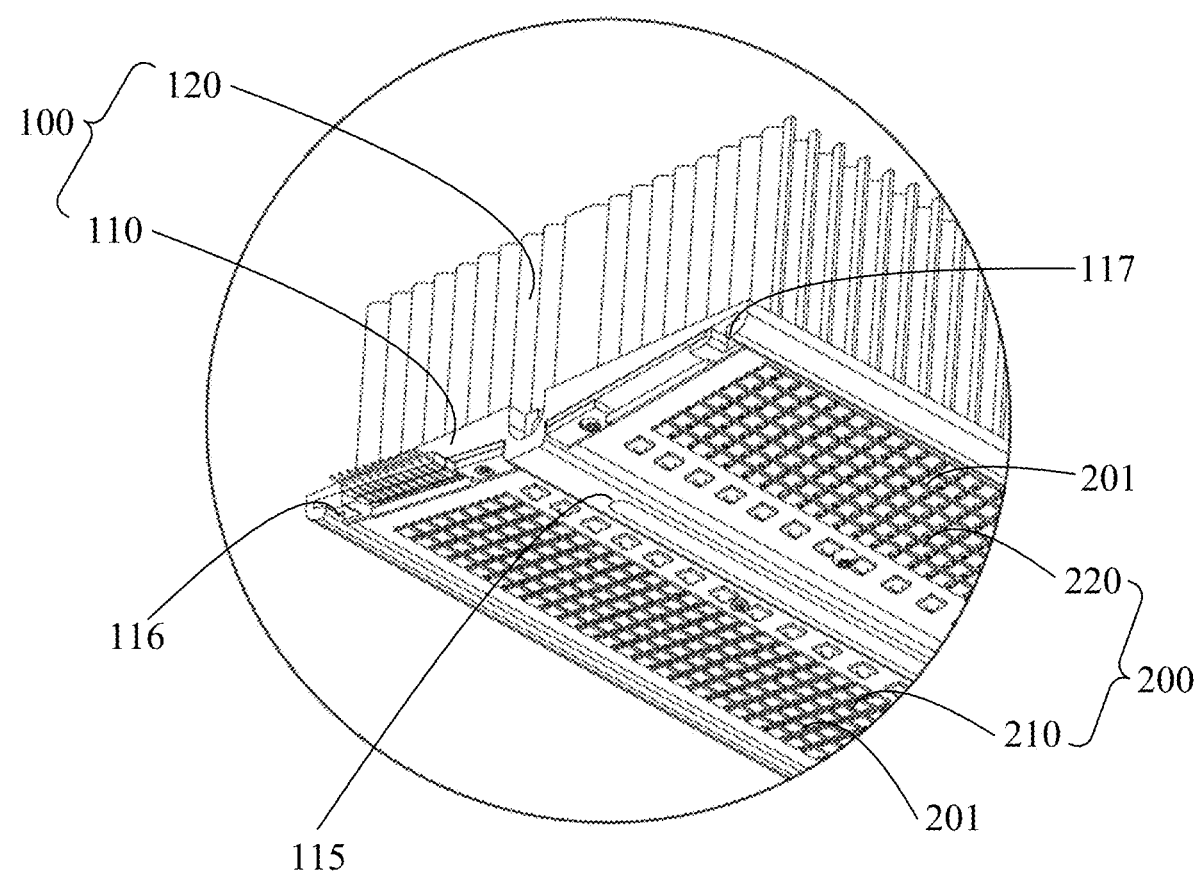
FIG. 3 is a partially enlarged view of part A of FIG. 2.
Figure 4:
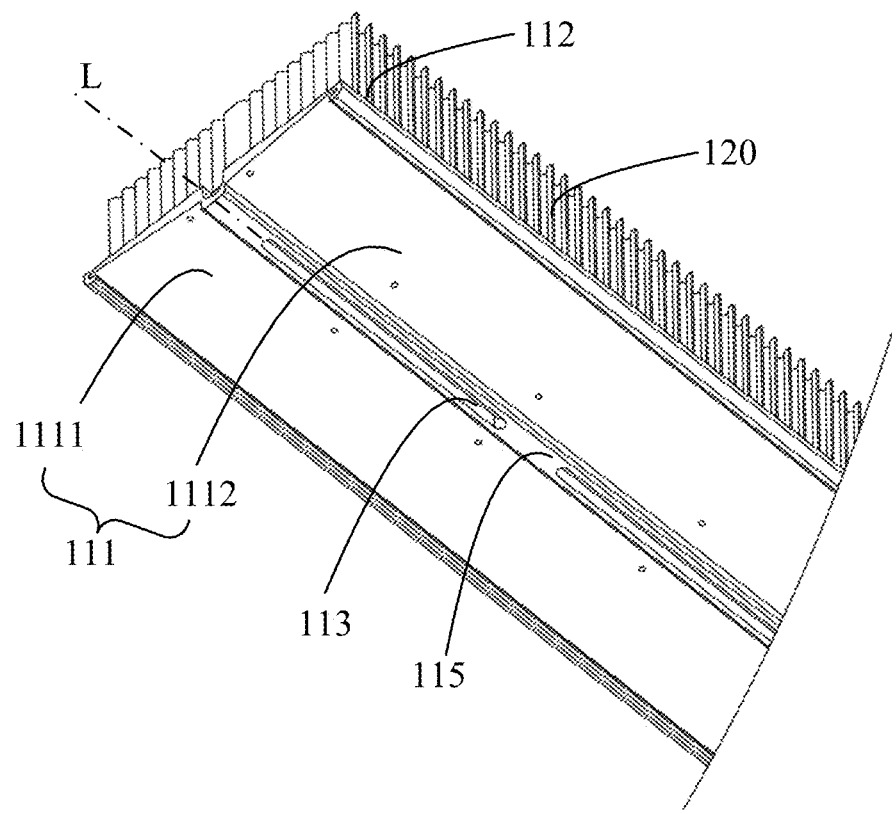
FIG. 4 is a partially structure diagram of a radiator according to an embodiment of the present application.

Referring to FIGS. 2 to 4, the lamp 10 includes a radiator 100 and a circuit board group 200 fixed on the radiator 100, wherein the radiator 100 includes a base 110 and a plurality of radiating fins 120 fixed on the base 110, the base 110 includes a mounting surface 111 and a radiating surface 112, the mounting surface 111 and the radiating surface 112 are opposite to each other. The plurality of radiating fins 120 are arranged on the radiating surface 112 at intervals, and the circuit board group 200 is arranged on the mounting surface 111.

The base 110 shown in the FIG. 2 is in a strip shape, understandably, the base 110 may be elliptical, semicircular, triangular and the like in another embodiments.

The mounting surface 111 includes a first mounting surface 1111 and a second mounting surface 1112. Correspondingly, the circuit board group 200 includes a first circuit board 210 and a second circuit board 220. The first circuit board 210 is arranged on the first mounting surface 1111, and the second circuit board 220 is arranged on the second mounting surface 1112. An included angle α is defined between the first mounting surface 1111 and the second mounting surface 1112 (shown in FIG. 5), and a direction of the included angle α towards the radiating fins 120, so that there is also an included angle between the first circuit board 210 and the second circuit board 220.

The first circuit board 210 and the second circuit board 220 are respectively provided with LED modules 201, the LED modules 201 may be a plurality of lamp beads distributed in a matrix, or one or more light bars. Since the first circuit board 210 and the second circuit board 220 are not arranged on the same flat surface, and the included angle between the first circuit board 210 and the second circuit board 220 is opposite to the light-emitting direction of the LED modules 201, a illumination angle of the LED modules 201 is increased, thereby increasing the light-emitting region of the LED modules 201.

In practical applications, the included angle α between the first mounting surface 1111 and the second mounting surface 1112 can be set according to the light-emitting region of the LED modules 201, so as to control the light-emitting region of the lamp 10 according to the needs of users, and improve the utilization rate of light sources.

Optionally, the first mounting surface 1111 and the second mounting surface 1112 are located on both sides of a longitudinal centerline L of the base 110, that is, the first mounting surface 1111 and the second mounting surface 1112 are symmetrical, and the area of the first mounting surface 1111 is equal to the area of the second mounting surface 1112. Understandably, the first mounting surface 1111 and the second mounting surface 1112 can also be asymmetric, which depends on the needs of users.

LED modules 201 are prone to generate a lot of heat after a long time of use, when the heat is accumulated inside the LED modules 201 and cannot be radiated, the temperature of the LED modules 201 will rise, and when a higher temperature is reached, LEDs of the LED modules 201 would be damaged, thus affecting the service life of the lamp 10. Therefore, in embodiments of the present application, the plurality of radiating fins 120 are arranged on the back surface of the mounting surface 111, that is, the radiating surface 112, and the bottom edges of the radiating fins 120 can be fixed on the radiating surface 112 by welding or inserting. The heat generated by the LED modules 201 can be conducted to the plurality of radiating fins 120 through the base 110, and the heat inside the LED modules 201 will be taken away by heat exchange between the plurality of radiating fins 120 and air.

The plurality of radiating fins 120 are perpendicular to the extension direction of the base 110, and each of the radiating fins 120 is in a wavy shape. Compared with a plate shape, the wavy shape can increase the contact area with air and improve the heat dissipation efficiency.

In order to further improve the overall heat dissipation efficiency of the radiator 100, the base 110 defines a number of radiating vents 113, the radiating vents 113 are located at a junction between the first mounting surface 1111 and the second mounting surface 1112, and penetrate along a thickness direction of the base 110. Optionally, the radiating vents 113 are rectangular.

Figure 5:
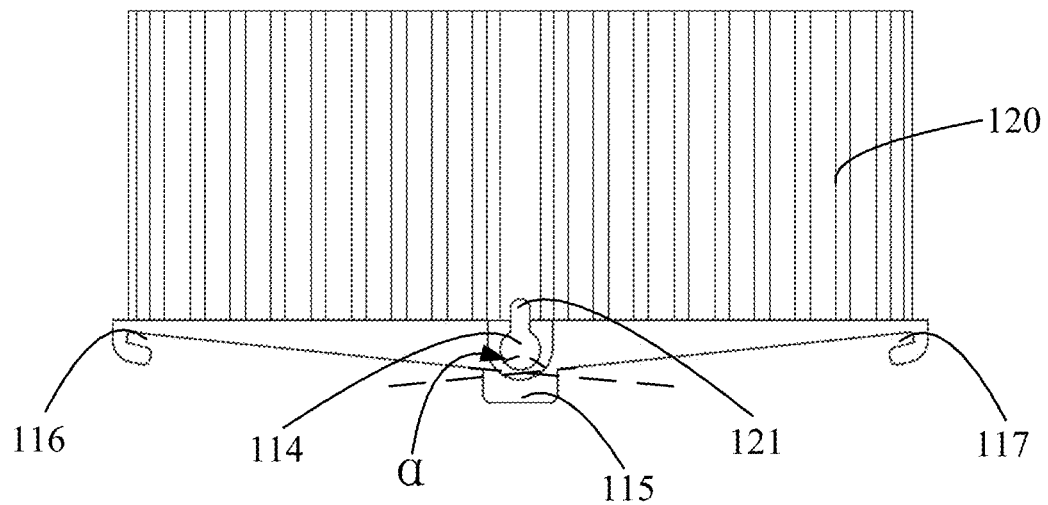
FIG. 5 is a front view of a radiator according to an embodiment of the present application.

Refer to FIG. 5 together, the base 110 further defines a radiating groove 114, the radiating groove 114 is located at the junction between the first mounting surface 1111 and the second mounting surface 1112, penetrates along a longitudinal direction of the base 110, and communicates with the radiating vents 113. The radiating vents 113 and the radiating groove 114 cooperate to form a circulation channel, which is conducive to air circulation, so that heat will not be accumulated in the radiating fins 120, thus enhancing the heat dissipation effect.

And, each of the radiating fins 120 above the radiating groove 114 defines with a notch 121 to increase the gap in the circulation channel, the notch communicates with the radiating groove 114.

It is understandable that when the first mounting surface 1111 and the second mounting surface 1112 are located on both sides of the longitudinal centerline L of the base 110, the radiating vents 113 and the radiating groove 114 are defined in the middle of the base 110, and the notch 121 is defined in the middle of each radiating fin 120.

In one embodiment, the base 110 is an integrally-formed part, the radiating surface 112 is a flat surface, and the thickness of the base 110 gradually decreases from the junction between the first mounting surface 1111 and the second mounting surface 1112 towards the edges of both sides, so that the first mounting surface 1111 and the second mounting surface 1112 are both inclined with respect to the radiating surface 112, and the included angle α is formed between the two. In a scenario, the first mounting surface 1111 and the second mounting surface 1112 are located on both sides of the longitudinal centerline L of the base 110, and the thickness of the base 110 gradually decreases from the middle of the base 110 towards the edges of both sides.

The junction between the first mounting surface 1111 and the second mounting surface 1112, such as, the middle of the base 110 shown in the figures extends in a direction away from the radiating surface 112 to form a protruding portion 115, the protruding portion 115 includes a first side wall close to the first mounting surface 1111 and a second side wall close to the second mounting surface 1112, and the edges of both sides of the base 110 are respectively turned inward to form a first mounting groove 116 in cooperation with the first mounting surface 1111 and a second mounting groove 117 in cooperation with the second mounting surface 1112.

After the first circuit board 210 is inserted into the first mounting groove 116, one side of the first circuit board 210 is received in the first mounting groove 116, the other side of the first circuit board 210 abuts against the first side wall of the protruding portion 115, such that the first circuit board 210 can be fixed on the first mounting surface 1111. Similarly, after the second circuit board 220 is inserted into the second mounting groove 117, one side of the second circuit board 220 is received in the second mounting groove 117, the other side of the second circuit board 220 abuts against the second side wall of the protruding portion 115, such that the second circuit board 220 can be fixed on the second mounting surface 1112.

Alternatively, the first side wall and the second side wall of protruding portion 115 are respectively provided with mounting grooves; and/or, the first circuit board 210 and the second circuit board 220 are further fixed on the first mounting surface 1111 and the second mounting surface 1112 respectively through screws.

The base 110 and the radiating fins 120 are usually made of aluminum, which only perform heat dissipation and are not easy to be damaged during use. When the LED modules 201 of the first circuit board 210 or the second circuit board 220 fails, the first circuit board 210 or the second circuit board 210 can be separately removed from a corresponding mounting surface without replacing the base 110 and the radiating fins 120, thus avoiding waste of resources due to the overall abandonment of the lamp 10.

Figure 6:
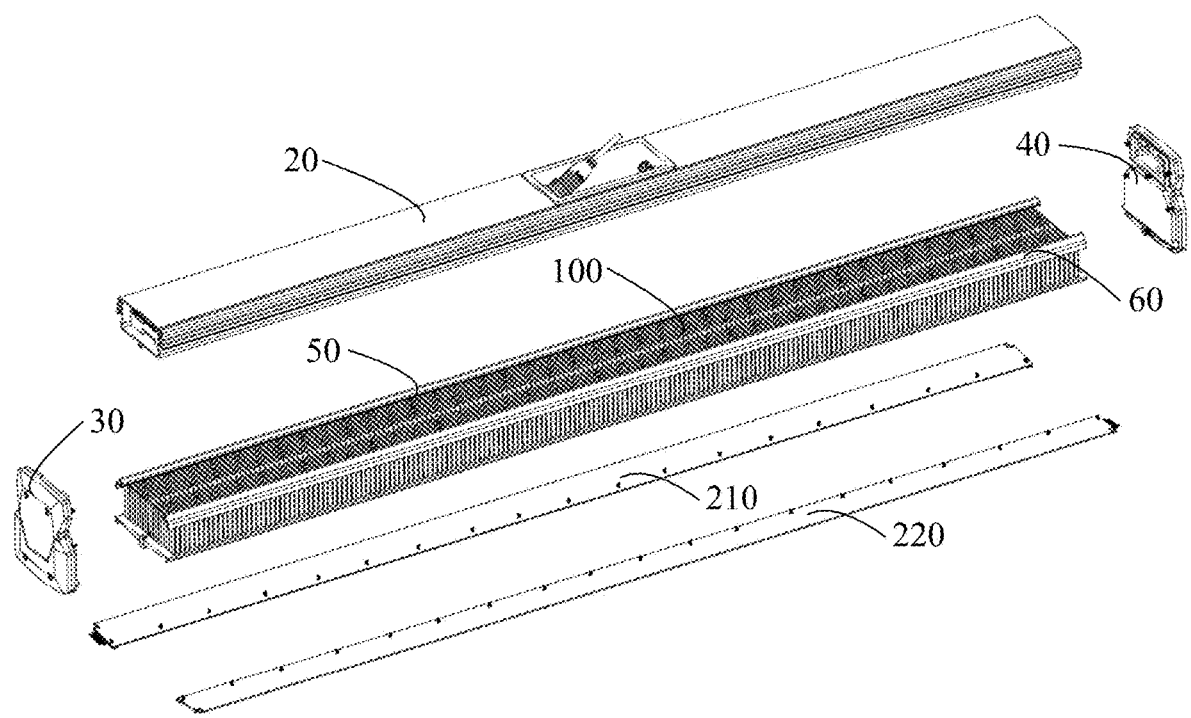
FIG. 6 is a exploded view of a lamp assembly according to an embodiment of the present application.

Refer to FIG. 6, the lamp assembly 1 further includes a first connecting member 30, a second connecting member 40, a first side baffle 50 and a second side baffle 60. The first connecting member 30 is configured to electrically connect the lamp driver 20 and the first circuit board 210, and the second connecting member is configured to electrically connect the lamp driver 20 and the second circuit board 220. The first side baffle 50 is arranged between one side edge and the top of the radiating fins 120, and the second side baffle 60 is arranged between the other side edge and the top of the radiating fins 120.

Specifically, one end of the lamp driver 20 is provided with a first conductive terminals, such as, a first socket, one end of the first connecting member 30 connected to the end of the lamp driver 20 is provided with a second conductive terminals, such as, a first plug that can be matched with the first socket, the other end of the first connecting member 30 is provided with a third conductive terminals, such as, a second socket, and one end of the first circuit board 210 connected to the other end of the first connecting member 30 is provided with a second fourth conductive terminals, such as, a second plug that can be matched with the second socket. The lamp driver 20 and the first circuit board 210 are electrically connected via four conductive terminals, and the electrical connection of the lamp driver 20 and the second circuit board 220 are similar.

Figure 7:
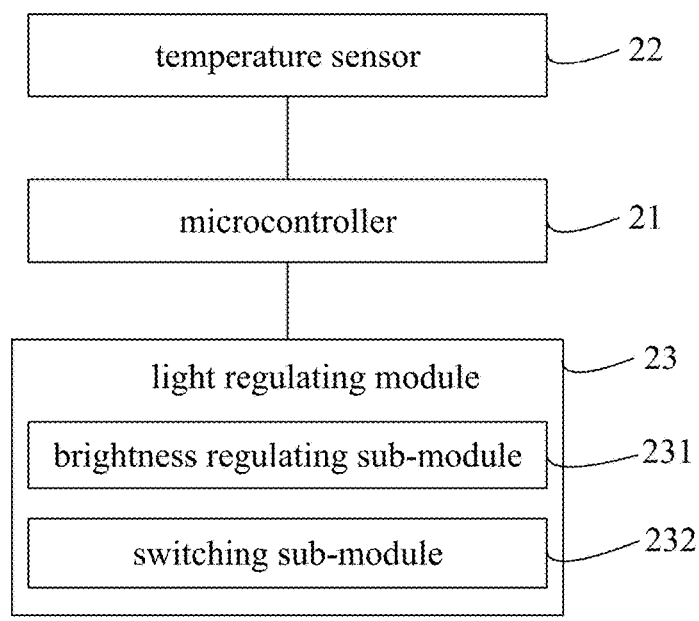
FIG. 7 is a hardware structure diagram of a lamp driver according to an embodiment of the present application.

The lamp driver 20 is configured with an overheat protection function. As shown in FIG. 7, the lamp driver 20 includes a microcontroller 21, a temperature sensor 22, and a light regulating module 23. The temperature sensor 22 and the light regulating module 23 are electrically connected to the microcontroller 21 respectively, and the temperature sensor 22 is configured to detect a temperature of the environment, the microcontroller 22 is configured to control the operation of the LED modules 201 of the first circuit board 210 and the second circuit board 220 with the light regulating module 23 according to the temperature of the environment, for example, to control the LED modules 201 to turn on, turn off, or regulate their brightness.

Wherein, the light regulating module 23 includes a brightness regulating sub-module 231 and a switching sub-module 232. The brightness regulating sub-module 231 may be a PWM dimming module, an analog voltage dimming module or a thyristor dimming module, and the switching sub-module 232 may be a MOS tube, a relay and other electronics switch.

When the temperature of the environment detected by the temperature sensor 22 is greater than a first temperature threshold, the microcontroller 21 controls the light regulating module 23 to regulate the brightness of the LED modules 201 to darken it, thereby lowering the temperature of the environment. When the temperature of the environment detected by the temperature sensor 22 is greater than a second temperature threshold, the microcontroller 21 controls the light regulating module 23 to turn off the LED modules 201 for overheat protection. When the temperature of the environment detected by the temperature sensor 22 is smaller than a third temperature threshold, the microcontroller 21 controls the light regulating module 23 to turn on the LED modules 201 again. Wherein the third temperature threshold is smaller than the first temperature threshold, and the first temperature threshold is smaller than the second temperature threshold.

The above regulating methods are only exemplary, for example, in another embodiment, more temperature thresholds can be set, when the temperature of the environment detected by the temperature sensor 22 is greater than a fourth temperature threshold, the microcontroller 21 controls the light regulating module 23 to regulate the brightness of the LED modules 201 of the first circuit board 210 or the second circuit board 220 to darken it, and when the temperature of the environment detected by the temperature sensor 22 is greater than a fifth temperature threshold, the microcontroller 21 controls the light regulating module 23 to turn off the LED modules 201 of the first circuit board 210 or the second circuit board 220. Wherein the fourth temperature threshold is greater than the third temperature threshold and smaller than the first temperature threshold, and the fifth temperature threshold is greater than the first temperature threshold and smaller than the second temperature threshold.

Finally, it should be noted that the above examples are intended only to illustrate the technical solutions of the present application, not to be limiting; the above embodiments or technical features in different embodiments may also be combined, the steps may be carried out in any order according to the idea of the present application, and many other variations in different aspects of the invention as described above exist, which are not provided in detail for the sake of brevity; although the present application has been described in detail with reference to the foregoing embodiments, those skilled in the art will appreciate that the technical solutions of the above embodiments can still be modified, or some of the technical features thereof may found their equivalents; and these modifications and equivalents do not render departures from the scope of the present embodiments of the invention.

What is claimed is:

1. A lamp radiator, comprising a base and a plurality of radiating fins fixed on the base;
   wherein the base comprises a mounting surface and a radiating surface opposite to the mounting surface, and the plurality of radiating fins are arranged on the radiating surface at intervals;
   the mounting surface comprises a first mounting surface and a second mounting surface, an included angle is defined between the first mounting surface and the second mounting surface, and a direction of the included angle towards the radiating fins;
   wherein the base defines a number of radiating vents, the radiating vents are located at a junction between the first mounting surface and the second mounting surface, and penetrate along a thickness direction of the base.

2. The lamp radiator according to claim 1, wherein the radiating fins are perpendicular to an extension direction of the base, and each of the radiating fins is in a wavy shape.

3. The lamp radiator according to claim 1, wherein the base defines a radiating groove, the radiating groove is located at the junction between the first mounting surface and the second mounting surface, penetrates along a longitudinal direction of the base, and communicates with the radiating vents.

4. The lamp radiator according to claim 3, wherein each of the radiating fins above the radiating groove is provided with a notch, and the notch communicates with the radiating groove.

5. The lamp radiator according to claim 4, wherein the base is an integrally-formed part, the radiating surface is a flat surface, and a thickness of the base gradually decreases from the junction between the first mounting surface and the second mounting surface towards edges of both sides.

6. The lamp radiator according to claim 5, wherein the first mounting surface and the second mounting surface are located on both sides of a longitudinal centerline of the base, the radiating vents and the radiating groove are defined in a middle of the base, the notch is defined in a middle of each of the radiating fins, and the thickness of the base gradually decreases from the middle of the base towards the edges of both sides.

7. The lamp radiator according to claim 6, wherein the middle of the base extends in a direction away from the radiating surface to form a protruding portion, and the edges of both sides of the base are respectively turned inward to form a first mounting groove in cooperation with the first mounting surface and a second mounting groove in cooperation with the second mounting surface.

8. A lamp, comprising a radiator and a circuit board group fixed on the radiator, and the radiator comprising a base and a plurality of radiating fins fixed on the base;
wherein the base comprises a mounting surface and a radiating surface opposite to the mounting surface, and the plurality of radiating fins are arranged on the radiating surface at intervals;
the mounting surface comprises a first mounting surface and a second mounting surface, an included angle is defined between the first mounting surface and the second mounting surface and a direction of the included angle towards the radiating fins,
wherein the base defines a number of radiating vents, the radiating vents are located at a junction between the first mounting surface and the second mounting surface, and penetrate along a thickness direction of the base;
the circuit board group comprises a first circuit board and a second circuit board respectively provided with LED modules, the first circuit board is arranged on the first mounting surface, and the second circuit board is arranged on the second mounting surface.

9. The lamp according to claim 8, wherein the radiating fins are perpendicular to an extension direction of the base, and each of the radiating fins is in a wavy shape.

10. The lamp according to claim 8, wherein the base further defines a radiating groove, the radiating groove are located at a junction between the first mounting surface and the second mounting surface, the radiating groove penetrates along a longitudinal direction of the base, and the radiating groove communicate with the radiating vents; each of the radiating fins above the radiating groove defines a notch, and the notch communicate with the radiating groove.

11. The lamp according to claim 10, wherein the first mounting surface and the second mounting surface are located on both sides of a longitudinal centerline of the base, and the radiating vents and the radiating groove are defined in a middle of the base, the notch is defined in a middle of each of the radiating fins.

12. The lamp according to claim 11, wherein the base is an integrally-formed part, the radiating surface is a flat surface, and a thickness of the base gradually decreases from the middle of the base towards edges of both sides.

13. The lamp according to claim 12, wherein the middle of the base extends in a direction away from the radiating surface to form a protruding portion, and the edges of both sides of the base are respectively turned inward to form a first mounting groove in cooperation with the first mounting surface and a second mounting groove in cooperation with the second mounting surface;
one side of the first circuit board is received in the first mounting groove, the other side of the first circuit board abuts against one side wall of the protruding portion, and one side of the second circuit board is received in the second mounting groove, the other side of the second circuit board abuts against the other side wall of the protruding portion.

14. A lamp assembly, comprising a lamp driver, a lamp, a first connecting member, and a second connecting member, the lamp comprising a radiator and a circuit board group fixed on the radiator, and the radiator comprising a base and a plurality of radiating fins fixed on the base;
wherein the base comprises a mounting surface and a radiating surface opposite to the mounting surface, and the plurality of radiating fins are arranged on the radiating surface at intervals;
the mounting surface comprises a first mounting surface and a second mounting surface, an included angle is defined between the first mounting surface and the second mounting surface, and a direction of the included angle towards the radiating fins, the circuit board group comprises a first circuit board and a second circuit board respectively provided with LED modules, the first circuit board is arranged on the first mounting surface, and the second circuit board is arranged on the second mounting surface;
the first connecting member is configured to electrically connect the lamp driver and the first circuit board, and the second connecting member is configured to electrically connect the lamp driver and the second circuit board.

15. The lamp assembly according to claim 14, the base defines a number of radiating vents and a radiating groove, the radiating vents and the radiating groove are both located at a junction between the first mounting surface and the second mounting surface, the radiating vents penetrate along a thickness direction of the base, the radiating groove penetrates along a longitudinal direction of the base, and the radiating vents and the radiating groove communicate with each other;
each of the radiating fins above the radiating groove defines a notch, and the notch communicate with the radiating groove.

16. The lamp assembly according to claim 15, wherein the first mounting surface and the second mounting surface are located on both sides of a longitudinal centerline of the base, the radiating vents and the radiating groove are defined in a middle of the base, and the notch is defined in a middle of each of the radiating fins.

17. The lamp assembly according to claim 16, wherein the base is an integrally-formed part, the radiating surface is a flat surface, and a thickness of the base gradually decreases from the middle of the base towards edges of both sides;
the middle of the base extends in a direction away from the radiating surface to form a protruding portion, and the edges of both sides of the base are respectively turned inward to form a first mounting groove in cooperation with the first mounting surface and a second mounting groove in cooperation with the second mounting surface;
one side of the first circuit board is received in the first mounting groove, the other side of the first circuit board abuts against one side wall of the protruding portion, and one side of the second circuit board is received in the second mounting groove, the other side of the second circuit board abuts against the other side wall of the protruding portion.

18. The lamp assembly according to claim 14, wherein the lamp driver comprises a microcontroller, a temperature sensor, and a light regulating module, the temperature sensor and the light regulating module are electrically connected to the microcontroller respectively;
the temperature sensor is configured to detect a temperature of environment, the microcontroller is configured to control operation of the LED modules of the first circuit board and the second circuit board with the light regulating module according to the temperature of environment.

19. The lamp assembly according to claim 18, wherein when the temperature of environment detected by the temperature sensor is greater than a first temperature threshold, the microcontroller controls the light regulating module to regulate brightness of the LED modules to darken it;
when the temperature of environment detected by the temperature sensor is greater than a second temperature threshold, the microcontroller controls the light regulating module to turn off the LED modules;
when the temperature of environment detected by the temperature sensor is smaller than a third temperature threshold, the microcontroller controls the light regulating module to turn on the LED modules again, the third temperature threshold is smaller than the first temperature threshold, and the first temperature threshold is smaller than the second temperature threshold.

* * * * *